United States Patent [19]

Wagner

[11] 3,870,744
[45] Mar. 11, 1975

[54] PROCESS FOR OXYGEN-ALKYLATION OF STERICALLY HINDERED PHENOLS

[75] Inventor: Eugene R. Wagner, Midland, Mich.

[73] Assignee: The Dow Chemical Company, Midland, Mich.

[22] Filed: Nov. 20, 1972

[21] Appl. No.: 307,935

Related U.S. Application Data

[63] Continuation-in-part of Ser. No. 41,557, May 28, 1970, abandoned.

[52] U.S. Cl. ...... 360/465 F, 260/473 C, 260/473 S, 260/521 A, 260/521 R, 260/570.7, 260/612 D
[51] Int. Cl. .................. C07c 43/20, C07c 65/02, C07c 121/74
[58] Field of Search ........ 260/465 F, 612 D, 473 C, 260/521 R, 570.7

[56] References Cited
UNITED STATES PATENTS
3,468,926  9/1969  Dorman ............................. 260/465

Primary Examiner—Elbert L. Roberts
Assistant Examiner—Dolph H. Torrence
Attorney, Agent, or Firm—Gary D. Street

[57] ABSTRACT

A process for oxygen-alkylating sterically hindered substituted or unsubstituted 2,6-di-t-butyl-phenol compounds, said process comprising reacting a 2,6-di-t-butylphenol reactant with an alkylating agent at ambient temperatures in the presence of a dipolar aprotic solvent and a base medium.

9 Claims, No Drawings

PROCESS FOR OXYGEN-ALKYLATION OF STERICALLY HINDERED PHENOLS

CROSS-REFERENCE TO RELATED APPLICATION

The present application is a continuation-in-part of my copending application Ser. No. 41,557, filed May 28, 1970 and now abandoned.

BACKGROUND OF THE INVENTION

1. Field of the Invention

The present invention relates to the oxygen-alkylation of sterically-hindered 2,6-di-tert-butylphenol compounds.

2. Description of Prior Art

Steric hindrance as an overriding factor in the alkylation of ambient anions is reported by Kornblum et al., J. Am. Chem. Soc., 83, 3668 (1961), and by others in references cited therein. Although attempts have been made to alkylate the oxygen atom of 2,6-di-tert-butylphenols, Kornblum et al. report such attempts to result in products predominantly substituted in the para position, i.e., on a carbon instead of an oxygen atom. This predominant carbon alkylation in the para position results from the presence of the two tert-butyl groups, each ortho to the hydroxy group of the phenol, which causes severe steric hindrance about the hydroxyl group and account for the fact that 2,6-di-tert-butylphenol does not behave as a normal, i.e., unhindered phenol in the usual alkylation processes.

Because of this severe steric hindrance, only small alkylating agents, such as methyl iodide or ethyl iodide, have heretofore been used to achieve oxygen, rather than carbon alkylation of 2,6-di-tert-butylphenol. Kornblum et al., utulizing a base medium of potassium t-butoxide and a protic alcohol solvent, reported 88 percent oxygen alkylation with a small alkylating agent, i.e., methyl iodide and only about 11% oxygen alkylation with ethyl iodide, while the use of a larger alkylating agent, i.e., isopropyl iodide resulted solely in carbon alkylation.

The oxygen-alkylation of unhindered phenols in DMSO was reported by Martin et al., Angew. Chem. Internat. Edit., 6:318 (1967), and by Kornblum et al., J. Am. Chem. Soc., 85, 1148 (1963). Wright et al., J. Org. Chem., 33, 1245 (1968), were successful in the oxygen-arylation of 2,6-di-isopropylphenol with p-nitrochlorobenzene in DMSO at 90°C. using KOH as a base. The oxygen-alkylation of 2,6-di-t-butylphenol, which is unique in its degree of steric hindrance, using DMSO under similar conditions has not been accomplished; only carbon alkylation in the para position is obtained.

The limitations of the foregoing described methods are apparent. It is evident from the above discussion that methods for overcoming steric hindrance properties present in 2,6-di-t-butylphenol compounds are desirable in order that the various oxygen-alkylated derivatives of 2,6-di-t-butylphenol compounds may be easily prepared.

SUMMARY OF THE INVENTION

It has now been discovered that the oxygen-alkylation of 2,6-di-tert-butylphenols with various alkylating agents can be accomplished despite the well-known steric hindrance present in this phenol. Accordingly, the present invention provides a method useful for the preparation of oxygen alkylated 2,6-di-tert-butylphenol compounds, said method comprising reacting a substituted or unsubstituted 2,6-di-tert-butylphenol reactant with an alkylating agent, the reaction being carried out at ambient temperatures and in the presence of a dipolar aprotic solvent and a base medium.

DETAILED DESCRIPTION OF THE INVENTION

According to the present invention, various oxygen alkylated phenol compounds are prepared by reacting a selected 2,6-di-tert-butylphenol reactant with a selected alkylating agent such as, for example, alkyl halides having at least 2 carbon atoms, haloalkyl acids and alkyl esters thereof, haldalkylamines, nitriles, or the like.

Various of the compounds contemplated as products of the method disclosed herein are oxygen-alkylated phenol compounds of the following structural formula

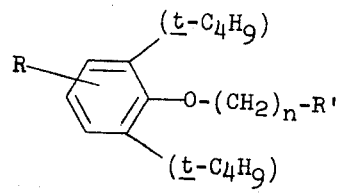

wherein R is hydrogen, alkyl, halogen or alkylester; R' is hydrogen, carboxy, amino, dialkylamino, nitrilo or alkyl ester, and $n$ is an integer of from 1 to 6, inclusive, with the proviso that when R' is hydrogen, $n$ is at least 2.

The alkyl radicals and portions of radicals enumerated above by R, R', and $n$ and R' taken together can contain from one to about six carbon atoms, as illustrated by, but not limited to, methyl, ethyl, propyl, isopropyl, butyl, t-butyl, amyl, hexyl, and the like. The term "halogen" includes bromine, chlorine, fluorine and iodine. Also contemplated within the purview of the present invention is the preparation of hydrochloride salts of the amine compounds.

The oxygen-alkylating method of the present invention is generally carried out by reacting a 2,6-di-tert-butylphenol of the formula:

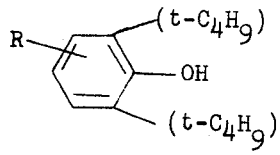

wherein R is as hereinbefore described, with an alkylating agent of the formula

X—(CH$_2$)$_n$—R' wherein $n$ and R' are as hereinbefore described and X is halogen. Representative suitable alkylating agents include, for example, alkyl halides having at least 2 carbon atoms, such as ethylbromide, n-propylbromide, n-butylchloride, amylchloride, hexylbromide, or the like, haloalkyl acids and corresponding alkyl esters thereof such as chloroacetic acid, chloropropionic acid, chlorohexanoic acid, methyl chloroacetate, ethyl bromoacetate, n-propyl chloroacetate, n-butyl bromoacetate, n-amyl bromoacetate, hexyl chloroacetate, ethyl bromopropionate, ethyl chlorohexanoate, or the like, and haloalkyl amines and nitriles such as 1-chloromethylamine, 2-chloroethylamine, 3-chloro-n-propylamine, 4-bromo-n-butylamine, 5-chloro-n- amylamine, 6-bromohexylamine, dimethylaminomethylchloride, diethylaminoethylchloride, diethylamino-n-butylchloride, di-n-propylamino-n-propylchloride, di-n-butylaminoethylchloride, di-n-butylamino-n-butylchloride, dihexylaminoethylchloride, diethylamino hexylchloride, chloroacetonitrile, bromo-n-propynonitrile, chloro-n-butyronitrile, chloro-n-hexynonitrile, hydrochloride salts of the foregoing haloalkylamines, and the like.

The nature of the substituted 2,6-di-tert-butylphenol reactants employed is not critical and the substituents can be varied as will be recognized by those skilled in the art. Representative phenol reactants, besides 2,6-di-tert-butylphenol, include 2,6-di-tert-butyl-p-tolyphenol, 2,4,6-tri-tert-butylphenol, 3,5-di-tert-butyl-α-hydroxyethylbenzoic acid, 2,6-di-tert-butyl-4-chlorophenol, 2,6-di-tert-butyl-3,5-dibromophenol or the like.

The reaction of the 2,6-di-t-butylphenol and alkylating agent conveniently is carried out in the presence of an inert solvent and base medium. Use of a dipolar aprotic inert solvent is preferred since such solvent only weakly solvates anions, thereby leaving the phenoxide ion comparatively unblocked by a solvent shield and thus considerably more reactive. Representative suitable dipolar aprotic solvents include dimethylsulfoxide, dimethylformamide, dimethylacetamide, tetramethylurea, nitrobenzene, acetonitrile, and the like. Suitable base medium materials include, for example, potassium hydroxide, sodium hydroxide, sodium hydride, potassium-t-butoxide, and the like. Preferably, pulverized potassium hydroxide pellets or a 50–70% aqueous solution of potassium hydroxide is employed as the base medium and dimethylsulfoxide is employed as the dipolar aprotic solvent.

The process of oxygen-alkylating 2,6-di-t-butylphenol is conducted at a temperature range of from about 20° to about 40°C. and is preferably conducted under ambient temperature conditions. The reaction readily goes forward under normal atmospheric pressures and may be conducted in an inert atmosphere if desired. Employment of an inert atmosphere is useful for reducing oxidation impurities; however, the products are relatively clean and may be easily isolated and purified without the use of such inert atmosphere.

The reactants may be contacted in any convenient manner; and, while the amount of the reactants to be employed is not critical, good yields are recovered when the reactants are employed in essentially equimolar proportions. Use of two equimolar proportions of base to alkylating agent is preferred when the alkylating agent is a haloalkylamine hydrochloride. When using alkyl halide alkylating agents, it is usually preferred that an excess of from about 2 to about 8 equimolar amounts of the alkyl halide be employed. Alkyl halides which react with base or are expensive may also be used when excess phenol and base (equivalent to the phenol) are employed to give higher yields based on the halide.

Ordinarily, the 2,6-di-t-butylphenol reactant is dissolved in a 2 to 10 fold excess of the dipolar aprotic solvent and the base medium is added to this mixture. The alkylating agent is added with stirring, and the resulting reaction mass is generally stirred at room temperature for a period of time from at least about ½ to about 2 hours, and preferably from about 2 to about 24 hours to assure substantial completion of the reaction. Upon completion of the reaction, the reaction mass is neutralized with acid and the desired product is conveniently separated therefrom by extraction with an appropriate organic solvent. Purification of the extract containing the desired product can be accomplished by washing with an appropriate liquid that is a solvent for impurities but not for the product. The organic solvent can be separated from the product by distillation under reduced atmospheric pressure, leaving the desired product in an oily admixture with unreacted phenol. The unreacted phenol may in turn be removed by vacuum distillation, leaving the desired product as an oil. Certain products of the present invention crystallize from their respective oils upon standing; such crystals can be removed by filtration and further purified by typical procedures such as recrystallization and the like.

DESCRIPTION OF THE PREFERRED EMBODIMENTS

The following examples illustrate the present invention and the manner by which it can be practiced but as such should not be construed as limitations upon the overall scope of the same.

EXAMPLE 1

Preparation of 2-(2,6-di-t-butylphenoxy)-triethylamine hydrochloride 2,6-Di-t-butylphenol (49.4 grams; 0.24 mole) and pulverized potassium hydroxide (22.4 grams; 0.4 mole) are added with rapid stirring to 450 milliliters of dimethylsulfoxide reagent at ambient temperature conditions. To this mixture, with rapid stirring, is added diethylaminoethyl chloride hydrochloride (34.4 grams; 0.2 mole). The reaction mass warms slightly from room temperature to about 30°C. and after about ½ hour of stirring the reaction mass turns green and the reaction temperature rises to about 35°C. The reaction mass temperature declines slowly upon continued stirring during the course of the reaction. After stirring the reaction mass for about 22 hours, the reaction mass is poured into one liter of dilute HCl and extracted three times with chloroform. The organic chloroform layers containing the desired product are separated from the reaction mass and combined, after which they are washed three times with water and dried over $Na_2SO_4$. Vacuum distillation is employed to remove the organic solvent, leaving the desired product in the form of an oil. Upon standing, the desired product crystallizes from the oil and is separated by filtration from the oil. The crystals thus obtained are washed with ether until colorless, and two subsequent recrystallizations from a methylene chloride/ether solution leaves the 2-(2,6-di-t-butylphenoxy)-triethylamine hydrochloride as a colorless crystalline solid melting at from 182° to 183.5°C. The infrared and nuclear magnetic resonance spectrum of the crystalline solid supports the proposed structure.

EXAMPLE 2 n-Propyl(2,6-di-tert-butylphenyl)ether 2,6-Di-tert-butylphenol (2.0 grams; 0.01 mole) and pulverized potassium hydroxide (0.6 grams; 0.01 mole) in one milliliter (ml.) of water were mixed with 10 ml. of dimethylsulfoxide. The resulting green solution was treated with n-propylbromide (5.0 grams; 0.04 mole) and the reaction mixture stirred at room temperature for a period of about 20 hours. Following the reaction period, the resulting clear yellow reaction mixture was poured into 100 ml. of 10% aqueous hydrochloric acid and the mixture extracted with three 30 ml. portions of chloroform and the extracts combined. The combined extracts were washed twice with water, dried over $Na_2SO_4$, and subjected to vacuum distillation to remove the organic solvent employed. The light yellow oil thus obtained was analyzed by vapor phase chromatography and the mixture distilled and the samples analyzed by nuclear magnetic resonance. As a result of such operations, it was found that 66% of the phenol starting material was alkylated, with about 48% of the product obtained being the desired n-propyl(2,6-di-tert-butylphenyl)ether compound, the remainder comprising about 43% percent carbon alkylated product and about 8% mixed carbon and oxygen alkylated product.

EXAMPLE 3

The operations of Example 2 above were repeated, ethyl bromide being employed in place of n-propylbromide. As a result of such operations, it was found that 80% of the phenol starting material was alkylated, with the product obtained containing about 87% of the desired oxygen alkylated ethyl(3,6-di-tert-butylphenyl)ether compound and only about 13% of the carbon alkylated product.

In procedures analogous to the foregoing examples and in accordance with the method of the present invention, the following oxygen-alkylated 2,6-di-tert-butylphenol compounds of the present invention are prepared:

2-(2,6-di-t-butyl-p-tolyl)oxy)triethylamine hydrochloride (melting at 174°–175°C.) by reacting 2,6-di-t-butyl-p-tolyl-phenol and diethylaminoethylchloride hydrochloride.

2-(2,4,6-tri-t-butylphenoxy)triethylamine hydrochloride (melting at 163°–165°C.) by reacting 2,4,6-tri-t-butylphenol and diethylaminoethylchloride hydrochloride.

2-(2,6-di-tert-butylphenoxy)ethylamine hydrochloride (melting at 257°–258°C.) by reacting 2,6-di-tert-butylphenol and 2-chloroethylamine hydrochloride.

2,6-di-tert-butylphenoxyacetonitrile (melting at 71°–73°C.) by reacting 2,6-di-tert-butylphenol and chloroacetonitrile.

(2,6-di-tert-butylphenoxy)ethyl acetate (boiling point 128°–130°C. at 0.6mm Hg) by reacting 2,6-di-tert-butylphenol and ethyl bromoacetate.

(3,5-di-tert-butyl-4-ethylcarboxymethoxy)ethyl benzoate (boiling point 164°–166°C. at 0.6mm Hg) by reacting (3,5-di-tert-butyl-4-hydroxy)ethyl benzoic acid and ethyl bromoacetate.

(2,6-di-tert-butylphenoxy)acetic acid (melting point 160°–161°C.) by reacting 2,6-di-tert-butylphenol and chloroacetic acid.

3-(2,6-di-tert-butylphenoxy)n-propylamine hydrochloride (molecular weight 299) by reacting 2,6-di-tert-butylphenol and 3-chloro-n-propylamine.

5-(2,6-di-tert-butylphenoxy)n-amylamine hydrochloride (molecular weight 327) by reacting 2,6-di-tert-butylphenol and 5-chloro-n-amylamine.

3-(2,6-di-tert-butylphenoxy)tri-n-propylamine hydrochloride (molecular weight 383) by reacting 2,6-di-tert-butylphenol and di-n-propylamino-n-propylchloride.

2-(2,6-di-tert-butylphenoxy)ethyl-dibutylamine hydrochloride (molecular weight 397) by reacting 2,6-di-tert-butylphenol and dibutylaminoethylchloride.

2-(2,6-di-tert-butylphenoxy)ethyl-dihexylamine hydrochloride (molecular weight 453) by reacting 2,6-di-tert-butylphenol and dihexylaminoethylchloride.

2-(2,6-di-tert-butylphenoxy)hexyl-diethylamine hydrochloride (molecular weight 397) by reacting 2,6-di-tert-butylphenol and diethylaminohexylchloride.

2,6-di-tert-butylphenoxy-n-butyronitrile (molecular weight 287) by reacting 2,6-di-tert-butylphenol and -chloro-n-butyronitrile.

2,6-di-tert-butylphenoxy-n-hexynonitrile (molecular weight 315) by reacting 2,6-di-tert-butylphenol and chloro-n-hexynonitrile.

n-butyl(2,6-di-tert-butylphenyl)ether (molecular weight 262) by reacting 2,6-di-tert-butylphenol and n-butylchloride.

(2,6-di-tert-butylphenyl)n-hexyl ether (molecular weight 290) by reacting 2,6-di-tert-butylphenol and n-hexylbromide.

n-butyl(2,6-di-tert-butylphenoxy)acetate (molecular weight 320) by reacting 2,6-di-tert-butylphenol and n-butyl bromoacetate.

(2,6-di-tert-butylphenoxy)hexyl acetate (molecular weight 348) by reacting 2,6-di-tert-butylphenol and hexyl chloroacetate.

(2,6-di-tert-butylphenoxy)propionic acid (molecular weight 292) by reacting 2,6-di-tert-butylphenol and chloropropionic acid.

(2,6-di-tert-butylphenoxy)hexanoic acid (molecular weight 334) by reacting 2,6-di-tert-butylphenol and chlorohexanoic acid.

(2,6-di-tert-butylphenoxy)ethyl propionate (molecular weight 320) by reacting 2,6-di-tert-butylphenol and ethyl bromopropionate.

(2,6-di-tert-butylphenoxy)ethyl hexanoate (molecular weight 362) by reacting 2,6-di-tert-butylphenol and ethyl chlorohexanoate).

(2,6-di-tert-butyl-4-chlorophenoxy)acetic acid (molecular weight 298) by reacting 2,6-di-tert-butyl-4-chlorophenol and chloroacetic acid.

The oxygen-alkylated phenols of the present invention are useful as pesticides for the control of many fungal and bacterial pests such as Staphylococcus aureus, Escherichia coli, Candida albicans, Trichophyton mentagrophytes, Bacillus subtilis, Aerobacter aerogenes, Aspergillus terreus, Candida pelliculosa, Pullularia pullualsn, Mycobacterium phlei, and Rhizopus nigricans.

I claim:

1. A method for preparing oxygen-alkylated 2,6-di-tert-butylphenols of the formula:

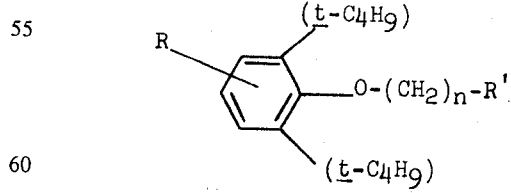

wherein R is hydrogen, alkyl, halogen or alkylester; R' is hydrogen, carboxy, amino, dialkylamino, nitrilo or alkyl ester, and $n$ is an integer of from 1 to 6, inclusive, with the proviso that when R' is hydrogen, $n$ is at least 2, which comprises reacting a 2,6-di-tert-butylphenol reactant of the formula:

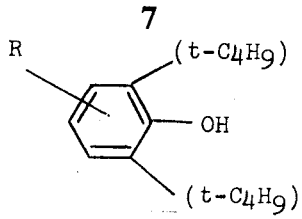

wherein R is as hereinbefore described, with an alkylating agent of the formula

X-(CH$_2$)$_n$-R' wherein $n$ and R' are as hereinbefore described and X is halogen, said reaction being carried out at ambient temperatures and in the presence of a dipolar aprotic solvent and a base medium.

2. The process of claim 1 wherein unsubstituted 2,6-di-tert-butylphenol is employed.

3. The process of claim 1 wherein a substituted 2,6-di-tert-butylphenol is employed.

4. The process of claim 1 wherein the dipolar aprotic solvent is selected from the group consisting of dimethylsulfoxide, dimethylformamide, dimethylacetamide, tetramethylurea, nitrobenzene, and acetonitrile, and the base medium is selected from the group consisting of potassium hydroxide, sodium hydroxide, and potassium-t-butoxide.

5. The process of claim 1 wherein the alkylating agent is selected from the group consisting of alkylhalides, haloalkyl acids and alkylesters thereof, haloalkylamines, and haloalkylnitriles.

6. The process of claim 3 wherein the phenol reactant is selected from the group consisting of 2,6-di-tert-butyl-(p-tolyl)phenol, 2,4,6-tri-tert-butylphenol, and 3,5-di-tert-butyl-α-hydroxyethyl-benzoic acid.

7. The process of claim 1 wherein essentially equimolar proportions of phenol reactant, alkylating agent, and base medium are introduced into a two to tenfold excess of dipolar aprotic solvent.

8. The process of claim 1 wherein the alkylating agent is a haloalkylamine hydrochloride and at least 2 molar proportions of base medium per molar proportion of said alkylating agent are employed.

9. The process of claim 1 wherein the alkylating agent is an alkylhalide and from two to about eight molar proportions of said alkylating agent per molar proportion of phenol reactant and base medium are employed.

* * * * *